United States Patent [19]

Meuschke et al.

[11] Patent Number: 4,519,519
[45] Date of Patent: May 28, 1985

[54] FUEL TRANSFER TUBE QUICK OPENING HATCH

[75] Inventors: Robert E. Meuschke, Penn Hills; Donald G. Sherwood, Monroeville; Bernard L. Silverblatt, Pittsburgh, all of Pa.

[73] Assignee: Westinghouse Electric Corp., Pittsburgh, Pa.

[21] Appl. No.: 352,601

[22] Filed: Feb. 26, 1982

[51] Int. Cl.³ .................. B65D 55/00; G21C 19/00
[52] U.S. Cl. .................................. 220/211; 376/204; 376/260; 220/314; 220/323; 220/291; 292/43
[58] Field of Search .............. 376/260, 262, 263, 264, 376/268, 269, 270, 271, 203, 204; 292/43; 220/323, 314, 211, 291; 49/395, 68, 147, 148; 114/368, 373, 374

[56] References Cited

U.S. PATENT DOCUMENTS

| | | |
|---|---|---|
| 1,416,308 | 5/1922 | Silverman et al. . |
| 2,045,587 | 6/1936 | Dean ................................. 114/374 |
| 2,865,829 | 4/1945 | Bellas et al. . |
| 2,955,452 | 10/1960 | Myers ........................... 220/323 X |
| 2,981,422 | 11/1957 | Bellinger et al. . |
| 3,072,549 | 1/1963 | Koutz et al. ................. 376/260 X |
| 3,087,644 | 4/1963 | Hill et al. ........................... 220/323 |
| 3,196,082 | 2/1963 | Lemesle et al. . |
| 3,279,627 | 7/1964 | Aubert et al. . |
| 3,298,746 | 2/1964 | Desmarchais et al. . |
| 3,435,794 | 4/1969 | Pechacek . |
| 3,667,649 | 6/1972 | Thillet .............................. 220/323 |
| 3,694,145 | 9/1972 | Stevens ....................... 220/323 X |
| 3,707,758 | 1/1973 | Townsend . |
| 4,044,918 | 8/1977 | Alton ................................ 220/314 |
| 4,073,239 | 2/1978 | Adler . |
| 4,121,383 | 10/1978 | Holmes et al. . |
| 4,223,575 | 9/1980 | Krueger ............................. 376/260 |
| 4,291,500 | 9/1981 | Reckin et al. ........................... 49/68 |
| 4,307,818 | 12/1981 | Singh et al. ...................... 220/323 X |

Primary Examiner—Richard E. Schafer
Assistant Examiner—Daniel Wasil
Attorney, Agent, or Firm—Daniel C. Abeles

[57] ABSTRACT

A quick opening hatch for use on a transfer tube of a nuclear reactor plant that is adapted to replace the conventional hatch on the transfer tube. A locking ring is provided with a plurality of screw openings that is adapted for connection to the transfer tube, and a hatch cover fitably received within the locking ring for closing-off the transfer tube. To lock the cover to the ring, latches are movably connected with the cover for locking engagement with the locking ring, and a sprocket with a plurality of crank arms is movably connected with the cover and the latches for movement thereof into locking engagement with a latch housing on the locking ring for locking the cover to the ring and out of engagement with the latch housing for releasing the cover from the locking ring so as to permit removal of the hatch cover from the locking ring to provide access to the transfer tube. A davit assembly is provided which is connected with the transfer tube and the hatch cover to move the cover away and to provide guidance for closing-off the transfer tube. The locking ring and hatch cover also include cooperating keys and keyways for alignment when closing the transfer tube. The cover is provided with sealing rings and the latch housing and latches include cooperating cam surfaces to provide a tight locking engagement by compressing the sealing rings between the transfer tube and the hatch cover.

6 Claims, 10 Drawing Figures

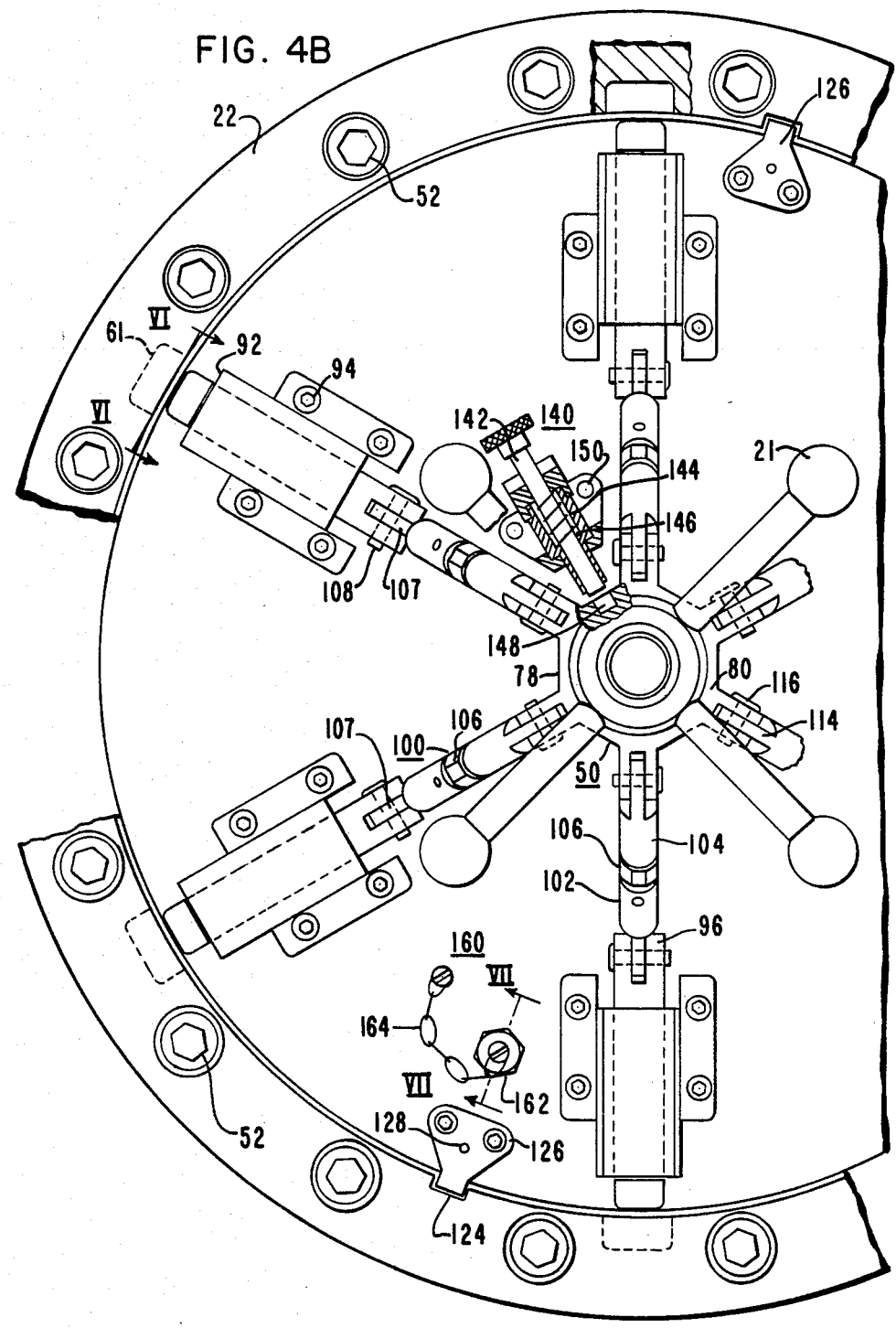

1

FUEL TRANSFER TUBE QUICK OPENING HATCH

BACKGROUND OF THE INVENTION

1. Field of the Invention

This invention is concerned with a quick opening hatch for use on the transfer tube of a nuclear reactor plant. More particularly, the invention is concerned with a quick opening hatch which will reduce the refueling time and operator exposure to radiation.

2. Description of the Prior Art

The time which it takes to refuel a nuclear power plant is very costly because of replacement power which has to be purchased during such time. U.S. Pat. No. 3,298,746 to Desmarchais et al which is directed to a material handling apparatus for transferring the radiated reactor components from one place to another indicates some of the problems in connection therewith.

In the operation of nuclear reactors, it is common to provide a fuel storage pit adjacent to a reactor or containment pit. The fuel pit generally contains water and is sunk into the earth for the handling and storage of irradiated reactor components such as control rods or fuel assemblies. In the refueling of a reactor, irradiated or spent fuel assemblies are transferred from the reactor pit to the fuel pit for temporary storage. This transfer is accomplished under water to protect the operators from the effect of radiation.

When refueling the nuclear power plant, it is necessary to remove a blind flange on the containment side of the fuel transfer tube in preparation for the flooding of the reactor cavity. After the refueling is completed, the reactor cavity is drained and the blind flange is replaced providing the pressure boundary between the spent fuel building or fuel storage pit and the inside of the containment building.

Heretofore, the fuel transfer system of the nuclear reactor supplied by the assignee of this application was furnished with a blind flange closure on the reactor end or containment side building of the transfer tube. The flange is attached to the tube by 20 bolts which must be removed and reinstalled for each refueling. The reinstallation is particularly time consuming since the bolts must be tightened to a prescribed torque in a specified sequence to assure a leak proof seal. Normally, it takes two men about one hour to remove the flange and about two hours to reinstall it.

As is well known, the longer an operator stays in close proximity to radioactive material the greater his radiation exposure. It is preferable to minimize any such exposure below the permissible exposure limits specified by government regulations. Therefore, it is desirable to be able quickly to remove and replace the flange so as to reduce both the refueling time and worker radiation exposure.

It is of particular concern to provide various means, apparatus and systems to perform the operations of fuel transfer as rapidly as possible both to reduce the amount of down time which is required to refuel the nuclear reactor, and more importantly to avoid as much as possible the amount of nuclear radiation to which the individuals involved in connection with fuel transfer are subjected.

The flange assembly heretofore used while good and quite useful does require about one hour to open the hatch and about two hours to close the hatch.

It is well known to provide various door closure mechanisms for securing a door onto a wall opening of undersea vessels. In particular, U.S. Pat. No. 4,121,383 to Holmes et al disclose a door closure mechanism to secure a door to an opening provided in a vessel. The door is provided with a dished configuration and spider-type locking arrangement which moves locking members transversely to the door axis into interlocking engagement with the vessel body. However, this patent is concerned with the provision of a door closure device which is to be used directly to close an opening, and its primary purpose is to provide for means to operate the door closure from either side of the door. There is no teaching that such a door closure mechanism can be used in connection with a nuclear reactor so as to provide for rapid opening and closing of the door closure mechanism. Further, there is no suggestion of an additional safety locking device for retaining the door closure mechanism so as to retain it in its locked condition. Moreover, there is no disclosure of the possibility of remote operation to reduce operator exposure to nuclear radiation.

Another door closure mechanism is disclosed in U.S. Pat. No. 1,416,308 to Silverman et al and this is an early type of closure device to prevent the entrance of water into a particular area. Further, the door closure mechanism here is also operable from either side of the door. This patent is concerned with the locking of water-tight doors in which horizontally movable bolts are connected with a vertically movable member that is threaded onto a shaft to move the bolts transversely and engage outer portion of the edges of the wall surrounding the openings to be closed. The hatch closure includes a ring wheel which abuts against the inside wall with a portion of the hatch overlying the opening, and here also the disclosure is concerned with the locking of the door to prevent water leakage. However, there is no disclosure of a possible application to a nuclear reactor and the provision for tight sealing and removal operations.

U.S. Pat. No. 3,435,794 to Pechacek is also concerned with a two-way pressure door lock assembly in which horizontally movable spring biased rods are connected to shoes that are readily movable, and there is no disclosure of applying such lock assembly to the sealing of a transfer tube for a nuclear reactor.

Closure devices for closing off the transfer tube of a nuclear reactor are disclosed in patents such as U.S. Pat. No. 3,196,082 to Lemesle et al and Desmarchais et al U.S. Pat. No. 3,298,746. However, these are not concerned with the provision of a quick opening and closing hatch assembly nor with a closure assembly which can be applied to the transfer tube of an existing nuclear reactor to provide for the rapid opening and closing.

OBJECTS OF THE INVENTION

It is therefore an object of the invention to provide a quick transfer tube closure which can be rapidly removed as well as rapidly reinstalled.

A feature of the invention is the provision of a quick opening transfer tube closure which can be removed in about five minutes and installed in less than 15 minutes so that the radiation exposure to the operator or operators can be reduced significantly.

Another feature of the invention is the provision of a transfer tube closure which can be removed and reinstalled automatically at a distance remote from the transfer tube closure.

Another object of the invention is to provide a quick transfer tube closure which can be remotely operated.

A further feature of the invention is to provide a transfer tube closure assembly which can be installed on existing nuclear reactor.

Yet a further feature of the invention is to provide a transfer tube closure assembly in which an additional mechanism is provided to lock the locking mechanism in the locked condition of the closure assembly.

A further feature of the invention is the provision of a camming action action between the hatch closure and a retainer for the hatch closure to provide for tight engagement between latches on the hatch closure that lock the hatch closure to the retainer which can be welded onto a transfer tube of an existing operating nuclear reactor.

SUMMARY OF THE INVENTION

In accordance with the invention, provision is made for a quick opening transfer tube closure which seals by means of a system of tapered locks and recesses which can be actuated for example by a single hand wheel. Furthermore, such actuation can take place remotely by means of an electric motor operated mechanism or by remotely operated winches and wrenches.

A retainer in the form of a bolting or locking ring is provided which attaches directly to the existing flange on the reactor end of the transfer tube. This ring contains recesses into which tapered locks or latches are movably inserted and fitted. The bolting or locking ring also includes guidance in the form of a keyway for the hatch assembly. The hatch assembly contains all of the operating mechanisms of the system. The hatch assembly includes a hatch cover which is sealed against the original transfer tube mating surface using two concentric elastomeric quad seal rings, and a locking mechanism for locking the hatch cover to the locking ring, and an assembly for operating the locking mechanism. A separate lock is also provided to secure the locking mechanism to prevent it from accidently opening during plant operation. A double seal tube bleed plug on the lower end of the hatch cover is provided to drain off any water accumulation in the transfer tube prior to the removal of the hatch.

To these ends, the invention consists in the provision of a quick opening hatch for use on a transfer tube of a nuclear reactor plant, and comprises a locking ring adapted for connection to the transfer tube, to form a base surface coextensive with the edge of the transfer tube, and a hatch cover fitably receiving within the locking ring for closing-off the transfer tube. A locking assembly that includes latches movably connected with the hatch cover cooperates with a housing in the locking ring, and latch movers or operation devices are connected with the hatch cover and a linkage for moving the latches into locking engagement with the housing for locking the hatch cover to the locking ring and out of engagement with the housing for releasing the hatch cover from the locking ring to permit removal of the hatch cover from the locking ring to provide access to the transfer tube.

The conventional transfer tube is provided with a weldment having a plurality of screw receiving openings, and the locking ring according to the invention is provided with a like plurality of screw receiving openings to attach the locking ring to the weldment. The hatch cover has a base portion which is seatable onto the weldment and the end of the transfer tube opening into the containment pit, and the housing and the latches include cooperating camming surfaces for forming the base portion of the hatch cover into a tight-fitting locking engagement with the weldment and the end of the transfer tube.

A drive sprocket for moving the latches into the housing is tracked onto a shaft that is rotatably coupled to the hatch cover coaxial with the longitudinal axis of the transfer tube in the locked condition of the hatch cover and the locking ring so that the drive sprocket is fixed relative to the hatch cover, but rotatably coupled with the shaft for movement transversely therealong in response to rotation of the shaft. A crank arm for each of the latches is provided for coupling thereof to the drive sprocket for movement of the latches into the housing upon rotation of the shaft for movement of the drive sprocket towards the top or outside face of the hatch cover and out of the housing upon movement of the drive sprocket away from the top of the hatch cover.

Each of the latches is movable on the top of the hatch cover in a latch guideway on top of the hatch cover in a direction radially of the axis of the shaft and includes a latching end having a sloped camming surface that is guided by the latch guideway for movement in the radial direction into a latch receiving opening for receiving the latching end.

A pair of elastomeric rings are coupled to the base of the hatch cover juxtaposed to the periphery thereof for compression thereof against the end of the transfer tube opening to provide a tight seal when the camming surfaces are pressure engaged together for locking the hatch cover to the locking ring.

Other features include an adjuster for adjusting the length of the crank arm so that latches are all uniformly engaged within the housing in the locked condition. Both the locking ring and the hatch cover include cooperating alignment members such as a keyway and a complementary key for guidance of the hatch cover into the locking ring. The invention also provides for locking maintenance mechanism to maintain the drive sprocket in its locked condition so as to avoid accidental opening due to jarring or just general loosening of the drive sprocket from its locked condition.

An advantage of the closure system according to the invention is the rapid and easy removal as well as quick opening and closing operations. The operating time can be reduced from one hour to five minutes for removal of the hatch cover to open the transfer tube and to a period of from two hours to 15 minutes for closing off the transfer tube when reapplying the hatch cover. As a result, radiation exposure can be reduced to about ten percent of the present level of exposure.

In one embodiment of the invention, a hand operated hand wheel is used to operate and insert locking latches on the hatch cover into latch receiving openings in the locking ring and for unlocking. In another embodiment a long-handled tool such as a wrench is used to operate the locking latches instead of the hand wheel both for locking and unlocking. The cooperating alignment members assist in assuring a positive and rapid alignment of the hatch cover and the locking ring to facilitate guiding the hatch cover into the locking ring.

Specifically, in order to avoid the use of the hand wheel, a male hex piece can be formed as part of the center shaft or it can be used on the center shaft without the hand wheel. A long handle tool which has an air operated impact wrench attached to its end can be used in cooperation with the hex piece to effect a further remote removal of the hatch closure to avoid radiation. This air operated impact wrench is slipped over the male hex piece and operated to release the hatch. The air operated tool can be operated in both vertical and horizontal positions so that it can be used to remove the hatch cover from the ring and then it can be connected with the davit assembly to raise the hatch cover. Once the hatch is raised, it can then be pivoted out of position by means of the tool.

After initial installation of the locking or outer support ring, it then becomes a permanent attachment to the transfer tube and is not removed and does not need to be removed at subsequent hatch openings and closings. The outer support ring includes the latch receiving opening or housing for each latch.

The hatch assembly as noted generally consists of a hatch body or cover which is the pressure retaining member and a mechanism for moving and locking for example six latches each connected with a crank arm into position. In order to operate the latches, a center spool or drive sprocket is advanced by means of a rotating acme power thread. As the center spool advances it tends to straighten out the crank arm which is connected to the spool and moves the latches outwardly away from the center spool and into the support ring housings.

The latches are each provided with an inclined plane surface which contacts a mating bearing surface on the latch housing exerting a bearing force thereon to thereby effect a seal at the elastomer seal rings.

In order to lock the latches into place, the locking maintenance mechanism includes a locking pin that is provided which engageable with a hole in the center spool when the latches are in the latch housings. The adjustment device is provided for each crank arm to adjust the length thereof to assure that each latch is properly seated within the latch housing. By turning a nut, the crank arm may be lengthened or shortened to insure uniform contact between latches and the latch housing in the support ring.

Other objects, features and advantages of the invention will become apparent as the following description proceeds wherein features of novelty, which characterize the invention will be pointed out with particularity.

For a better understanding of the invention reference may be had to the accompanying drawings.

BRIEF DESCRIPTION OF THE DRAWINGS

FIGS. 4A and 4B are each a planar projection of the quick opening transfer tube closure assembly including the hatch cover locking ring and locking assembly and the hatch cover locking ring and locking assembly for locking the hatch cover to the locking ring with FIG. 4A illustrating the latches in a locked condition and FIG. 4B illustrating the latches in an open condition;

DESCRIPTIONN OF THE PREFERRED EMBODIMENTS

Figure 1:
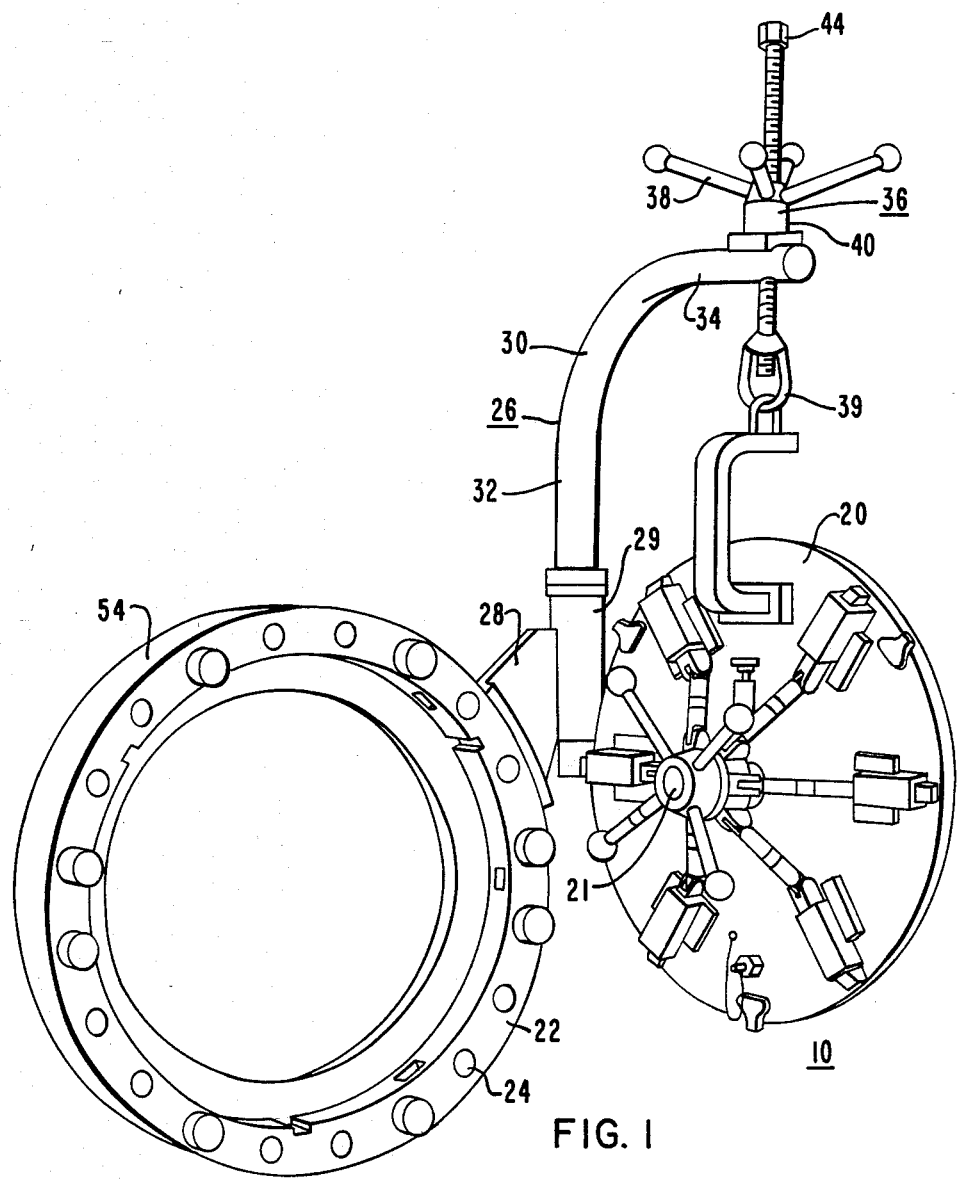
FIG. 1 is a partially perspective view of a quick opening transfer tube closure assembly in its open position, which is used for closing-off a transfer tube opening into the refueling compartment which in the closed condition closes-off the transfer tube on the containment side, together with a davit assembly for supporting a hatch cover forming part of the closure assembly.
Figure 2:
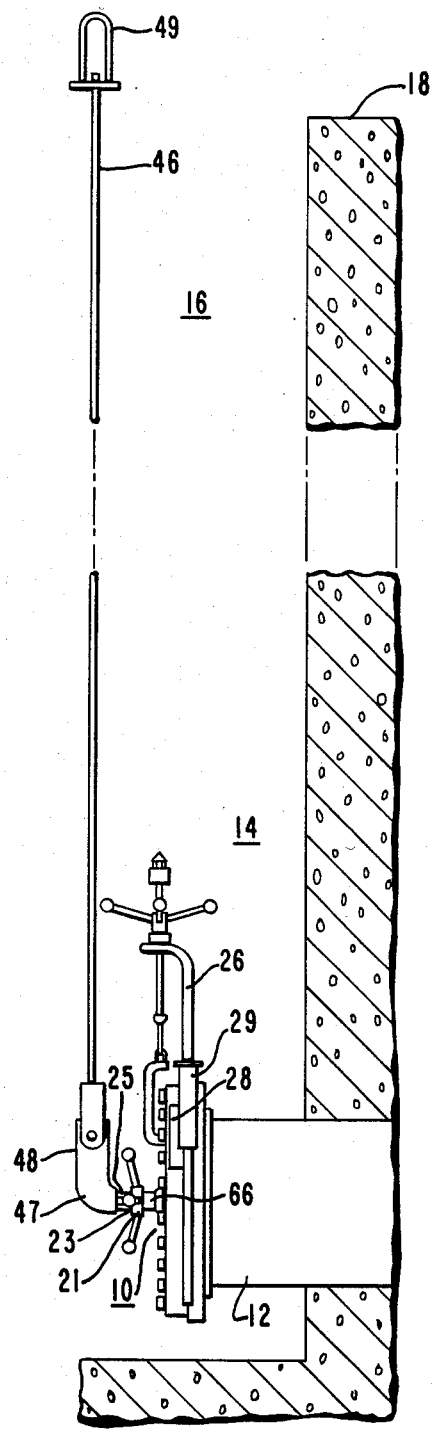
FIG. 2 is a partially schematic view of the closure assembly together with an automatic assembly for connection and disconnection of the hatch cover from a remote position.
Figure 3:
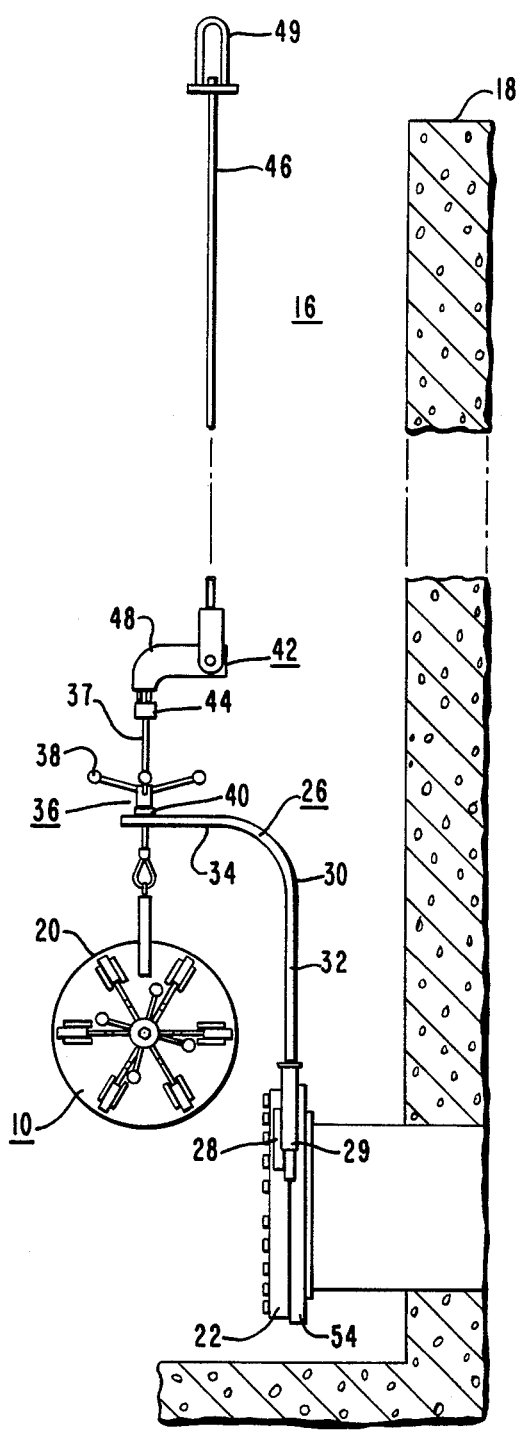
FIG. 3 is a partially schematic view of the closure assembly together with the automatic assembly of FIG. 2 used with the davit assembly for raising the hatch cover and moving it out of position to provide for accessibility to the transfer tube.
Figure 4A:
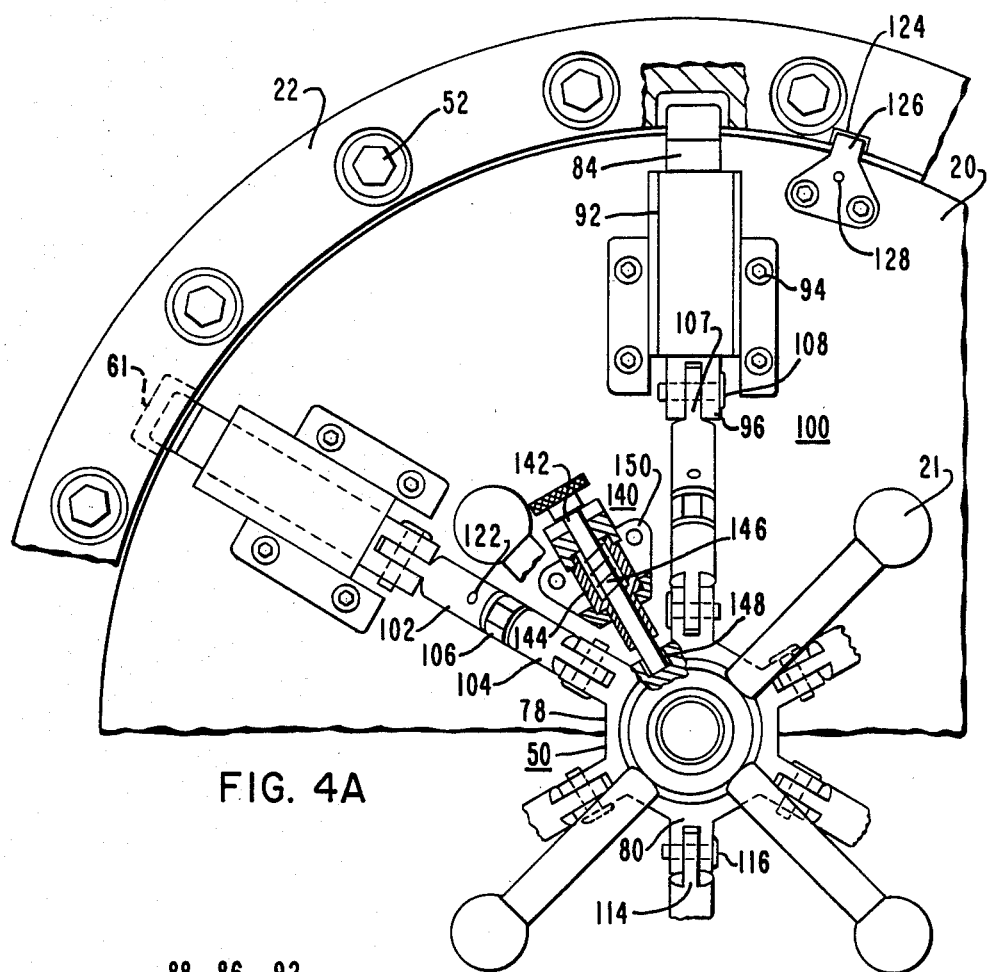

Referring now more particularly to the drawings, and in particular to FIGS. 1-3 which show a quick opening transfer tube closure assembly 10 for closing off a transfer tube 12 situated on the containment side 14 in the refueling compartment 16. Level 18 is shown to indicate a generally remote position from compartment 16 to provide for automatic remote operation. Reference is made to U.S. Pat. No. 3,298,746 to Desmarchais et al which is incorporated herein by reference for a more detailed description of a system for transferring nuclear-type components from one compartment to another.

Transfer tube closure assembly 10 includes a hatch cover 20 which cooperates with a locking ring 22 surrounding transfer tube 12 and connected thereto by any suitable means to weldment 54 which contains bolt-receiving and locking openings 24. Davit assembly 26 is coupled to locking ring 22 and with hatch cover 20 for holding thereof in a suspended condition proximate to transfer tube 12 for closure and initial alignment with locking ring 22, but away therefrom during fuel handling or transferring. Hatch cover 30 is shown with a hand wheel or manually operated locking/unlocking device 21 in FIG. 1 and with an automated locking/unlocking device 23 in FIG. 2,, to be described further hereinafter.

Davit assembly 26 includes bracket assembly 28 fixed to the locking ring 22 to locate and align hatch cover 20 with the opening in locking ring 22 surrounding the opening of transfer tube 12 and in alignment with locking ring 22 for initial locating and subsequent aiding of locking thereto of the hatch cover 20 and for movement away therefrom during fuel transfer or material handling. A davit arm 30 has one end 32 pivotally connected with bracket assembly 28 and the other end 34 curved in a direction transverse to the first end 32 for supporting a lifting assembly 36.

In FIG. 1, lifting assembly 36 includes an acme threaded shaft 37, hatch cover raising/lowering hand wheel 38 coupled to shaft 37 for rotation thereof and screw mechanism 40 fixed to davit arm 30 for axially raising and lowering shaft 37 upon rotation thereof for manually raising hatch cover 20. Swivel 39 connects hatch cover 20 to shaft 37 so that hatch cover 20 is raised or lowered as hand wheel 38 is rotated. In FIG. 3, an automated assembly 42 is shown which can be used to rotate hand wheel 38 in order to raise hatch cover 20 after it is removed from locking ring 22. As noted, in one embodiment of the invention, hatch cover 20 is provided with manually operated locking device 21 or hand wheel, and lifting assembly 36 is also provided with a hand wheel 38. Both hand wheel 21 and hand wheel 38 may each be provided with a male hex piece 25 and 44 (or hex adapter) which forms part of the center shaft 66 to which a long-handled tool 46 forming part of the automated locking/unlocking device 23 and automated assembly 42 is adapted to engage for effecting a remote locking/unlocking operation. Long-handle tool 46 is used interchangeably both for hatch cover 20 removal and reattachment (FIG. 2) as well as for raising and lowering of hatch cover 20 when used in conjunction with davit assembly 26 (FIG. 3). The long handle tool 46 includes a female end portion or coupling 47 which is adapted to grip the male hex pieces 25 and 44 for operation automatically and from a position remote from handles 21 and 38.

Although not shown in the figures, in lieu of long-handled tool 46, the operation could be further automated by incorporating the air operated or hydraulic power device 48 as part of the closure assembly. Air or hydraulic lines would run to a power supply on the operating deck. The closure could then be operated by a technician located at a remote location such as the control room.

Long-handled tool 46 may be an air operated impact wrench 48 which has coupling 47 adapted to be slipped over male hex piece adapter 25 or 44. The air operated tool is operable both in a vertical and a horizontal position. Tool 46 is first coupled with hex adapter 25 and used to remove hatch cover 20 from locking ring 22, and then it is removed from adapter 25 and connected with hex adapter 44 and used in conjunction with davit assembly 26 to raise hatch cover 20 by means of acme thread shaft 37 or equivalent and pivot davit arm 30 in sleeve 29 out of position.

It will be evident that an operator may operate tool 46 from level 18 by manipulation of handle 49 at a position remote from transfer tube 12.

Referring now more particularly to FIGS. 4 to 7 which show closure assembly 10 for closing off transfer tube 12 and includes hatch cover 20, locking ring 22 and lock assembly 50, but with the details of the davit assembly and automated features of FIGS. 1-3 omitted for the purpose of clarity. Locking assembly 50 is shown in FIGS. 4A and 5A in its locked condition and in FIGS. 4B and 5B in the unlocked condition. FIGS. 4A and 5B show a portion of the closure assembly 10 in it locked condition and FIGS. 5A and 5B show a portion of the closure assembly in its unlocked condition.

Locking ring 22 is connected by means of twenty locking screws 52 for holding locking ring 22 to fuel transfer tube weldment 54. Locking ring 22 is provided with six latch receiving openings or latch housing 61 which are substantially U-shaped in cross-section with one face-leg portion 58 substantially perpendicular to the axis of transfer tube 12, and the other face-leg portion 60 is a sloped face which is inclined or sloped in a direction to narrow the opening 56 towards the base of the U-shaped opening so that the mouth 57 of opening 56 is wider than the base 59 thereof.

Hatch cover 20 has a central portion 62 provided with a central opening 64 coaxial with the longitudinal axis of transfer tube 12 when hatch cover 20 is in its locked condition with locking ring 22. Rotatable shaft 66 having an acme thread thereon has one end received within sleeve bushing 68 positioned within central opening 64 and rotatably held therein by means of thrust washer 70 and locking nut 72. Shaft 66 is undercut at 71 to receive thrust washer 70 which is locked to bushing 68.

Rotatable hand wheel 21 is locked to the other end of rotatable shaft 66 by means of key 74 to cause rotation of shaft 66 manually in bushing 68. Male hex piece 25 which may form an extension of hand wheel 21 or be coupled thereto and to shaft 66 is for automatic operation as described heretofore. Hand wheel 21 and male hex piece 25 are held to shaft 66 by means of locking retaining ring 76. Alternatively, the other end of shaft 66 may be integrally formed with male hex piece 25 and locking retaining ring 76 locks hand wheel 21 to shaft 66.

Figure 5A:
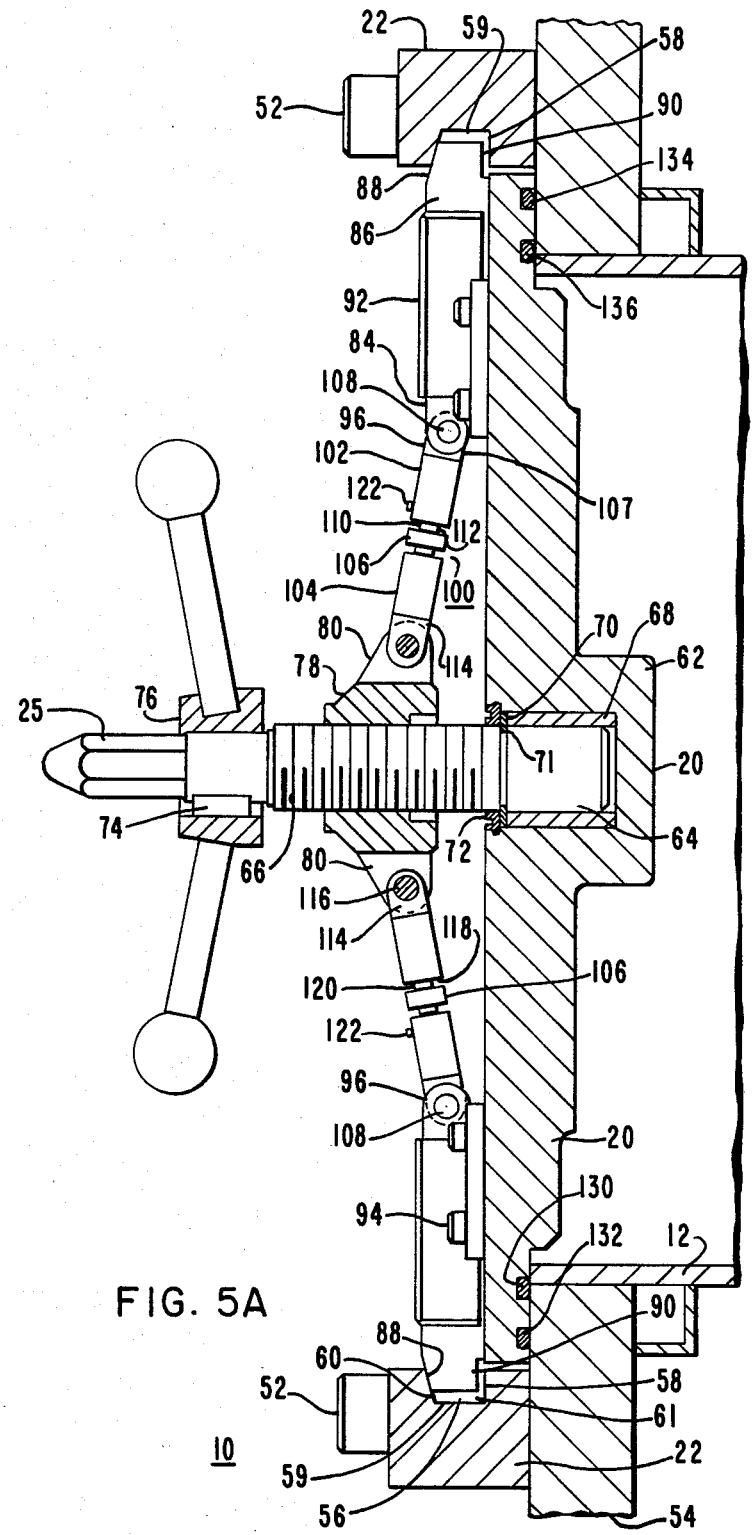
FIGS. 5A and 5B are each partial transverse sectional views of the transfer tube closure assembly showing the hatch cover, locking ring, locking assembly together with a portion of the transfer tube as it opens into the refueling compartment, with FIG. 5A being a sectional view showing the latches in a locked condition with the latch housing and FIG. 5B being a sectional view showing the latches in their unlocked condition.
Figure 5B:
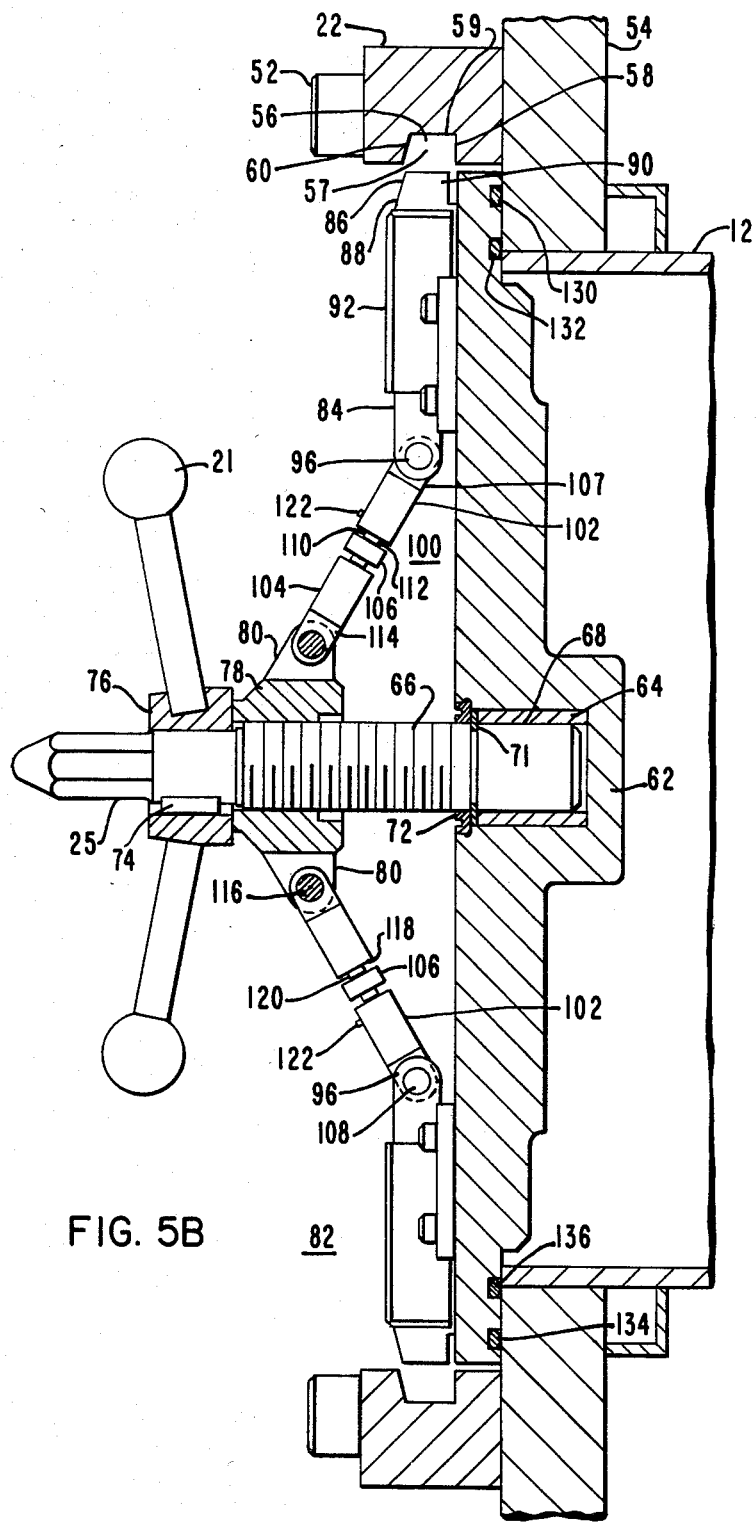

Drive sprocket 78 is rotatably coupled to shaft 66 for axial movement therealong as shaft 66 is rotated. The upper position of sprocket 78 shown in FIG. 5B is the unlocking condition, and the lower position of drive sprocket 78 when substantially flush with the top of hatch cover 20 as shown in FIG. 5A is its locking condition. Drive sprocket 78 is a spider-type assembly which includes six U-shaped portions 80 having a pair of spaced ears formed by the legs of the U-shaped member.

There is a U-shaped portion 80 for each latch receiving opening 56 and there is a like number of latch assemblies 82. Each latch assembly 82 includes a first movable member or latch 84 movably controlled for movement parallel with the top of hatch cover 20 and transversely movable in a direction normal to the longitudinal axis of shaft 66. Movable member or latch 84 includes a latching end 86 which in the locked condition of the hatch cover 20 and locking ring 22 is adapted to engage sloped face leg portion 60. For this purpose latching end 86 includes a complementary sloped portion or face 88 (FIGS. 5 and 6) for effecting a camming action when the two sloped faces 60, 88 engage to provide for the locking of hatch cover 20 to locking ring 22, and a base portion 90 which is a substantially flat surface and is complementary to face leg portion 58.

Latch housing or latch guideway 92 is provided to guide movement of latch 84 along the top of cover 20 for movement of latching end 86 into and out of latch receiving opening 56. Housing or latch guideway 92 is connected to cover 20 by conventional attachment means such as screws 94. The other end of latch 84 is provided with a tongued receiving opening 96 having a pair of leg portions.

Connecting each of the latches 84 to spider assembly 78 is a crank arm or connecting assembly 100 which includes a pair of connectors 102, 104 joined together by an adjustable connector crank arm length adjuster 106 which is adjustable to draw members 102, 104 closer together for shortening or to separate them for lengthening the crank arm. Connector 102 has one end which includes a tongue portion 107 received within tongue receiving opening 96 and pivotally or rotatably connected therewith by means of pivot connector 108. The other end of connector 102 has an internally threaded receiving opening 110 for receiving adjustment screw end 112 of adjustable connector 106. In a similar manner, connector 104 has a tongue portion 114 at one end thereof receiving within U-shaped portion 80 and pivotally connected thereto by means of pivot 116 and an internally threaded receiving opening 118 for receiving adjustable screw end 120 of adjustable connector 106. To lock adjustable connector 106 in placed after adjustment, locking screw 122 is provided which extends through the wall of threaded receiving opening 110 for locking engagement with adjustable screw end 112 to lock adjustable connector 106 with connector 102, 104 and preventing rotation of adjustable connector 106 due to jarring and other movements of the connecting assembly 100.

Cooperating hatch cover and locking ring location mechanism is provided for centering hatch cover 20 within locking ring 22 and includes a plurality of keyways 124 on locking ring 22 and complementary keys 126 together with alignment adjustment members 128 on the top of hatch cover 20 which provide for centering within 60 mils at least three cooperating keys 126 and keyways 124.

Hatch cover 20 is provided with a pair of O-ring or quad ring retainers 130, 132, for holding therein a concentric arrangement about the axis of shaft 66 a pair of quad sealing rings 134, 136 on the underside thereof or base of cover 20, facing the opening of transfer tube 12, for engaging the facing of the opening of transfer tube 12 and for engaging the facing surface of fuel transfer tube weldment 54. When the handle 21 screws drive sprocket 78 all the way down, pressure is exerted on the elastomeric quad rings 134, 136 as they engage the facing surface of the facing of transfer tube 12 and the facing surface of transfer tube weldment 54 by the camming action between surfaces 60 and 88.

Latch locking maintenance assembly 140 for locking drive sprocket 78 against rotation comprises a spring biased locking pin 142 which is retained within a guide assembly 144 and is spring urged outwardly thereof by spring 146 towards drive sprocket 78. Drive sprocket 78 is provided with a locking pin receiving opening 148 which is aligned with the locking pin 142 when the drive sprocket 78 is in its lowermost position in substantial abutment with the top or outer face of the hatch cover 20 with the latch ends 86 of latches 84 engaged within their respective latch receiving openings or housings 56.

Guide assembly 134 is fixed in a predetermined position to drive sprocket 78 when in its lowermost position on hatch cover 20 by means of screws 150 and held in place thereto to assure alignment of locking pin 142 with locking pin receiving opening 148. Alignment is only required when sprocket 78 is moved axially along rotatable shaft 66 from its uppermost position, the unlocked position, to its lowermost position, so that locking pin 142 can be spring urged by spring 146 into locking pin receiving opening 148 for positioning locking pin 146 in opening 148. Though not shown, the locking pin 142 is provided with a dowel which is oriented transverse to and passes through the axis of the pin and extends through the circumference of the locking pin and a slot in the guide assembly 144. The slot in the guide assembly housing is orientated and sized to permit the dowel to travel in the direction of locking pin movement, while limiting such movement to that necessary to effect locking and unlocking of the drive sprocket 78. The slot is enlarged at each end so that rotation of the locking pin at these extremities of travel will maintain the locking pin's position in the corresponding locked or unlocked condition. For remote operation the locking pin may be motivated to its withdrawn position by a solenoid or fluid operated piston.

Figure 7:
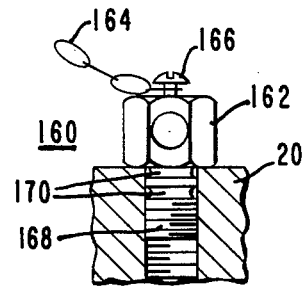
FIG. 7 is a partial sectional view taken along line VII—VII of FIG. 4B illustrating the drain plug in detail; and, FIG. 8 is a partial sectional view similar to FIG. 6 taken along line VI—VI showing an alternative embodiment of the latch according to the invention.

Referring to FIGS. 4B and 7, which show details of the drain assembly 160 including drain plug 162 held to hatch cover 20 by means of sash chain 164. The sash chain 164 is connected to the drain plug by a conventional screw 166. To provide a suitable seal, shaft 168 of drain plug 162 is provided with a pair of spaced O-ring seals 170. The double seal tube bleed plug on the lower end of the hatch cover 20 is used to drain off any water accumulation in the transfer tube prior to removal of hatch cover 20.

Figure 8:
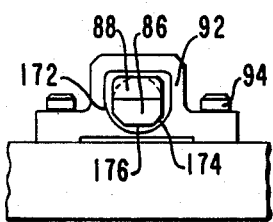
Figure 6:
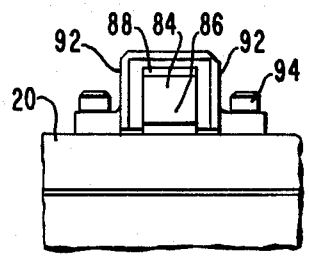
FIG. 6 is a partial sectional view taken along line VI—VI of FIG. 4B showing one embodiment of the latch according to the invention.

Referring now to FIG. 8 which illustrates an alternative configuration of latch 84 and latch end 86. Like parts have been designated with the same reference numerals. The base of latch 84 has its bottom and connecting sides beveled as at 172 and 174 with a shortened connecting base 176. The latch receiving opening 56' has a curved bottom to provide smoother initial entry of latch end 86' into opening 56'.

The quick opening hatch according to the invention as heretofore described replaces the existing blind flange and a latch cover which is screwed onto the aforesaid flange with twenty screws which must be removed each time the hatch cover is removed and reinserted each time the hatch cover is reattached. In accordance with the invention, the quick opening hatch consists of two main pieces which are the outer support ring 22 and the hatch cover 20 which is easily and simply removable from and attachable to the support ring 20.

The outer support ring 22 is attached to the transfer tube 12 with the same quantity of bolts 52 that held the prior heretofore used blind flange in place. After initial installation of locking ring 22, it becomes a permanent attachment to the transfer tube 14 and is not removed at subsequent hatch openings and closings.

In the operation of the closure assembly, the hatch cover 20 which is the pressure retaining member closing off transfer tube 12 and the mechanism for moving and locking the six latches 86 into position can be manually or automatically operated. To operate the latches manually, hand wheel 21 is rotated which in turn advances the center spool or drive sprocket 78 on the acme power thread 67 on rotatable shaft 66. As the spool or drive sprocket advances, it tends to straighten out the crank arm or connecting assembly 100 which moves the latches 86 out into groove or latch receiving openings 56 in the support ring. Automatic operation is accomplished with the long handled tool or by any other suitable means including motor operation of shaft 66.

The inclined plane forming the sloped portion 88 on the latches contacts the sloped portion 60 on support ring exerting a force on surface 60 on the latch housings 61 thereby effecting a seal at the elastomer seal or quad rings 134, 136.

To lock the latches 84 in place, the aforementioned dowel pin is raised and locking pin 142 is spring biased and urged into locking pin receiving opening 148 by spring 146 in the drive sprocket 78. For most purposes spring 146 can be made sufficiently strong to maintain locking pin 142 in locking pin receiving opening unless affirmatively removed.

In order to insure overall uniform contact between the latches 84 and locking ring 22 and to provide for proper balance, crank arm or connecting assembly 100 is adjustable to shorten or lengthen the crank arm by turning crank arm length adjuster 106.

The davit assembly 26 together with long-handled tool 46 are further usuable together with closure assembly 10 to reduce the time required and to facilitate removal of hatch cover 20 from locking ring 22 and the reinstallation and locking of hatch cover 20 to locking ring 22.

While there has been disclosed what is considered to be the presently preferred modes for carrying out the invention to provide for a rapidly operable closure assembly for a transfer tube as heretofore explained, it will be obvious to those skilled in the art that various changes and modifications may be made therein without departing from the scope of the invention.

What we claim is:

1. A quick operating hatch assembly for sealing and unsealing an opening at an outer peripheral end of a transfer tube located in a lower portion of a containment pit of a nuclear reactor building, wherein said opening is surrounded by a circumferential weldment, comprising:
   a locking ring connected to said weldment;
   a hatch cover fitably received within said locking ring and having a base portion seatable onto said weldment;
   locking assembly means including latching means movably connected with said hatch cover, housing means in said locking ring, and latching means movable means connected with said hatch cover and said latching means for movement of said latching means into locking engagement with said housing means for locking said hatch cover to said locking ring and out of engagement with said housing means for releasing said hatch cover from said locking ring whereby to permit removal of said hatch cover from said locking ring to provide access to the transfer tube, wherein said latching means movable means includes a shaft rotatably coupled to said hatch cover coaxial with the longitudinal axis of the transfer tube in the locked condition of said hatch cover and said locking ring, a spider assembly fixed relative to said hatch cover, rotatably coupled to said shaft and movable transversely therealong in response to rotation of said shaft, a crank arm for each said latching means for coupling thereof to said spider assembly for movement of said latching means into said housing means upon rotation of said shaft for movement of said spider towards the top of said hatch cover and out of said housing means upon movement of said spider assembly away from the top of said hatch cover, wherein said latching means includes a latch movable on the top of said hatch in a direction radially on the axis of said shaft and latching end having a sloped camming surface, and including, a latch guideway on the top of said hatch cover for guiding said latch for movement in the radial direction, and wherein said housing means includes a latch receiving opening for receiving said latching end, said latch housing having an inner sloped roof portion forming a camming surface for engagement with said aforementioned camming surface to upon closure of said hatch cover force said hatch cover against said weldment;
   a pair of elastomeric rings coupled to the base of said hatch cover juxtaposed to the periphery thereof for compression thereof to provide a tight seal when the base of said hatch cover is engaged with the rim of the transfer tube and said weldment when said camming surfaces are pressure engaged together for locking said hatch cover to said locking ring; and
   external drive connection means remotely connectable to and detachable from said shaft and operable when connected to said shaft to remotely and selectively drive said shaft in either a clockwise or counterclockwise direction to affect correspondingly closure or opening of said latching means from a location external of said pit.

2. The hatch assembly of claim 1 wherein said external drive connection includes a hex piece connected at one end of said shaft and a wrench adapted to fitably engage said hex piece for remote operation of said latching means movable means from a location external of said pit.

3. The hatch assembly of claim 1 including a davit assembly pivotably coupled with said weldment and means coupled to said hatch cover for pivotably moving said hatch cover away from the transfer tube after release therefrom and for initially aligning said hatch cover with the transfer tube prior to locking thereto, said coupling means including an acme threaded screw rotatably coupled to said davit assembly for raising and lowering the hatch cover, and means coupled to said acme threaded screw for rotation thereof.

4. The hatch assembly of claim 19 wherein said external drive connection means is remotely connectable to and detachable from said acme threaded screw and is remotely operable in the connected condition to selectively drive said screw either clockwise or counterclockwise to correspondingly raise or lower said hatch cover and pivot said davit.

5. A quick operating hatch assembly for sealing and unsealing an opening at an outer peripheral end of a transfer tube located in a lower portion of a containment pit of a nuclear reactor building, wherein said opening is surrounded by a circumferential weldment, comprising:
   a locking ring connected to said weldment;
   a hatch cover fitably received within said locking ring and having a base portion seatable onto said weldment;
   locking assembly means including latching means movably connected with said hatch cover, housing means in said locking ring, and latching means movable means connected with said hatch cover and said latching means for movement thereof into locking engagement with said housing means for locking said hatch cover to said locking ring and out of engagement with said housing means for releasing said hatch cover from said locking ring whereby to permit removal of said hatch cover from said locking ring to provide access to the transfer tube; and
   external drive connection means normally not connected to, and remotely operable from a location above the containment pit to be remotely connected to and detached from said latching means movable means and operable when so connected to remotely and selectively drive said latching means movable means in a direction to affect correspondingly either closure or opening of said latching means from a location external of said pit; and
   a davit assembly pivotally coupled with said weldment and means coupled to said hatch cover for pivotally moving said hatch cover away from the transfer tube after release therefrom and for initially aligning said hatch cover with the transfer tube prior to locking thereto, said coupling means including an acme threaded screw rotatably coupled to said davit assembly for raising and lowering the hatch cover, and means coupled to said acme threaded screw for rotation thereof and operable from a location above the containment pit substantially above the elevation of the davit assembly to affect such rotation.

6. The hatch assembly of claim 5 wherein said external drive connection means is normally not connected to and is remotely operable from the location above the containment pit to be connected to and detached from said acme threaded screw and is remotely operable in the connected condition to selectively drive said screw either clockwise or counterclockwise to correspondingly raise or lower said hatch cover and pivot said davit.

* * * * *